United States Patent Office 3,517,046
Patented June 23, 1970

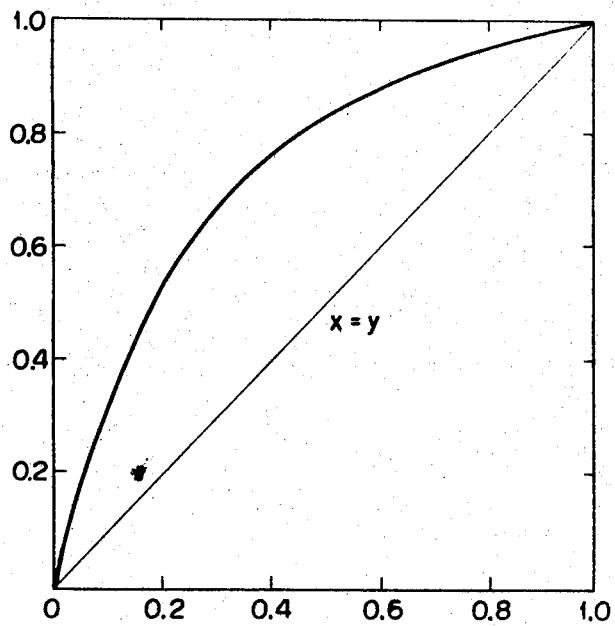

3,517,046
PROCESS FOR ISOMERIZING CIS-1,2-DICYANOCYCLOBUTANE
Goro Inoue and Makoto Honda, Tokyo, and Takashi Kobayashi, Saitama, Japan, assignors to Asahi Kasei Kogyo Kabushiki Kaisha, Osaka, Japn
Filed July 5, 1967, Ser. No. 651,253
Claims priority, application Japan, July 12, 1966, 41/45,070; June 14, 1967, 42/37,616
Int. Cl. C07c 121/00
U.S. Cl. 260—464                               5 Claims

ABSTRACT OF THE DISCLOSURE

Process for liquid phase isomerizing cis-1,2-dicyanocyclobutane to trans-1,2-dicyanocyclobutane which comprises heating cis-1,2-dicyanocyclobutane in a rectification-type reactor at a temperature ranging from 80 to 340° C. under atmospheric or subatmospheric pressure to convert at least a part thereof to trans-1,2-dicyanocyclobutane and removing the resulting trans-1,2-dicyanocyclobutane continuously from the reaction system.

BACKGROUND OF THE INVENTION

Field of the invention

This invention relates to a process for isomerizing cis-1,2-dicyanocyclobutane to trans-1,2-dicyanocyclobutane in a liquid phase.

Description of the prior art

It is described in U.S. Pat. No. 3,092,654 that in the preparation of adiponitrile by the hydrogenolysis of 1,2-dicyanocyclobutane, the isomerization of cis form to trans-form concurs during the hydrogenolysis reaction.

Also, French Pat. No. 1,406,886 describes that when the liquid phase hydrogenation of mixtures of cis- and trans-1,2-dicyanocyclobutane is carried out in the presence of cobalt or nickel catalysts, the proportion of diamine obtained may be greater than would be predicted from the proportion of trans-isomer in the starting material and therefore, some isomerization does occur in the liquid phase under these conditions.

Furthermore, U.S. Pat. No. 3,192,262 and Belgian Pat. No. 661,857 disclose the gas phase isomerization of cis-1,2-dicyanocyclobutane to trans-1,2-dicyanocyclobutane in the presence of a hydrogenation catalyst. These prior art processes have disadvantages in that there are required operations to vaporize the high boiling cis-1,2-dicyanocyclobutane and to dilute the resulting vapor with an inert gas as well as to reactivate the catalyst with reducing agent such as gaseous hydrogen in order to maintain the catalyst activity; and that the depolymerization of a part of 1,2-dicyanocyclobutane to acrylonitrile is almost inevitable.

SUMMARY OF THE INVENTION

The starting material, 1,2-dicyanocyclobutane, hereinafter referred to as "dinitrile," can be obtained in a good yield by the thermal dimerization of acrylonitrile which is available abundantly and inexpensively on the commercial scale, as described in British Pat. No. 897,275 and German Pat. No. 1,103,330. That is, by the thermal dimerization reaction at 250° C., there is obtained an equilibrium mixture consisting of approximately 40% of cis-1,2-dicyanocyclobutane, hereinafter referred to as "cis-isomer" and 60% of trans-1,2-dicyanocyclobutane, hereinafter referred to as "trans-isomer," and these isomers can be easily separated by fractional distillation into two fractions, i.e. pure cis- and trans-isomers.

It is possible to produce from the dinitrile diamine, dicarboxylic acid and diisocyanate useful as starting materials for producing high molecular polymers of great utilities, and it is highly desirable to obtain optionally cis-isomer or trans-isomer, respectively alone, or a mixture of these isomers in any desired proportion, in the production of various polymers having these cyclic monomers derived from the dinitrile as a recurring unit.

An object of this invention, therefore, is to provide a process for isomerizing cis-1,2-dicyanocyclobutane to trans-1,2-dicyanocyclobutane in the liquid phase free from inconveniences accompanied by the prior art processes.

We have found that cis-isomer can be isomerized to trans-isomer in the liquid phase by heating the cis-isomer in the absence of catalyst and that the liquid phase isomerization reaction can be accelerated by the existence of metals such as copper, nickel, stainless steel, Monel, titanium and zirconium accompanying a little or no side-reactions. We have further found that the isomerization reaction of cis-isomer to trans-isomer can be conducted almost quantitatively and rapidly by heating cis-isomer in the presence of certain organic compounds described in detail hereinafter instead of the above-mentioned metals while removing the resulting trans-isomer continuously from the reaction system.

The removal of the trans-isomer thus obtained can be accomplished quite easily by taking advantage of the considerable difference in boiling points between these isomers, i.e. the resultant trans-isomer having a boiling point of 135° C./10 mm. Hg, whereas the starting cis-isomer having that of 179° C./10 mm. Hg.

In the preferred embodiment of the process of this invention, the desired trans-isomer can be obtained quantitatively by heating cis-isomer or a mixture of cis-isomer and trans-isomer in the absence or presence of metals such as copper, nickel, stainless steel, Monel, titanium and zirconium, and/or organic compounds such as aromatic hydroxy compounds, aliphatic mono- or dicarboxylic acids having not less than 4 carbon atoms and pyridines in a rectification-type reactor at a temperature ranging from 80 to 340° C. under atmospheric or subatmospheric pressure to convert at least a part of the cis-isomer to trans-isomer and distilling the resulting trans-isomer off continuously from the reaction system at the top of the reactor.

In accordance with the process of this invention, the isomerization of cis-isomer can be readily carried out under mild reaction conditions free from undesirable side reactions. Thus, the process of this invention may be advantageously applied to the production of trans-isomer from cis-isomer on a commercial scale.

The isomerization reaction of cis-isomer to trans-isomer is an equilibrium reaction as illustrated in the following equation:

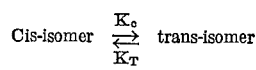

(1)

The equilibrium constant K, i.e. a ratio of trans-isomer to cis-isomer, of 1,3-dicyanocyclobutane at 250° C. or its vicinity is about 1.5 and there is no substantial change due to the temperature. That is, there is obtained an equilibrium mixture consisting of cis- and trans-isomers having nearly a fixed ratio of trans-isomer to cis-isomer, irrespective of the heating period of time. Thus, in order to obtain a pure isomer, the mixture of cis- and trans-isomers must be subjected to fractional distillation to separate one isomer from the other.

The isomerization rates between cis- and trans-isomers may be given by the following equations, respectively:

$$r_c = K_c[C] \quad (2)$$

$$r_T = K_T[T] \quad (3)$$

wherein $r_c$ is the isomerization rate of cis-isomer to trans-isomer, $K_c$ is a rate constant, $[C]$ is the concentration of cis-isomer, $r_T$ is the isomerization rate of trans-isomer to cis-isomer, $K_T$ is a rate constant and $[T]$ is the concentration of trans-isomer.

In the process of this invention, the resulting trans-isomer in the isomerization is removed continuously as it is produced, and therefore, $[C]$ in the reaction mixture inevitably takes larger value which, in turn, makes the value of $r_c$ in the Equation 2 larger. That is to say, in accordance with the process of this invention, the ratio of cis-isomer concentration to that of trans-isomer can be increased by removing the resultant trans-isomer from the reaction system by way of distillation and partial condensation with a result in the accelerated isomerization reaction rate. Thus, there is obtained a high purity trans-isomer from cis-isomer continuously using only a single reactor.

The following Table 1 illustrates the relationship between the temperatures vs. vapor pressures in cis- and trans-isomers of 1,2-dicyanocyclobutane and relative volatilities calculated therefrom. The table shows that the higher relative volatility facilitates the process of this invention.

TABLE 1

[Vapor pressure of 1,2-dicyanocyclobutane (mm. Hg)]

| Temperature (° C.) | 90 | 130 | 160 | 190 | 220 | 250 | 300 |
|---|---|---|---|---|---|---|---|
| Trans-isomer | 1 | 8 | 26 | 70 | 165 | 365 | |
| Cis-isomer | | 1.2 | 5 | 15 | 42 | 100 | 350 |
| Relative volatility | | 6.7 | 5.2 | 4.7 | 3.9 | 3.6 | |

In the process of this invention, since $K_T$ can be made negligibly small as compared with $K_c$ by distilling the resulting trans-isomer off continuously from the reaction system at the tower top, the isomerization of trans-isomer to cis-isomer can be substantially suppressed and only a high purity trans-isomer can be obtained. As can be noted from the examples described hereinafter, cis-isomer is insomerized quantitatively in the process of this invention, in contrast to prior art process in which the resulting trans-isomer is not removed from the reaction system, and only about 20% of the starting cis-isomer is converted to trans-isomer in 6 hours under the same conditions as those of the present process with respect to the temperature and the catalyst.

Thus, in accordance with this invention, there is provided an efficient and economical process for isomerizing cis-isomer to trans-isomer which can be advantageously applied on the commercial scale while suppressing completely the undesirable side reactions.

In practicing the process of this invention, a reaction temperature of from 80–340° C. may be employed. If the temperature is lower than 80° C., the reaction rate is quite low, and the temperature higher than 340° C. leads to remarkable side reactions such as the formation of tarry matter, the decomposition of dinitrile, etc. In order to maintain the reaction temperature within the range specified above, it is suitable to keep the reaction system under a reduced pressure of from 1 mm./Hg to 760 mm./Hg.

BRIEF EXPLANATION OF THE DRAWING

The drawing shows a vapor-liquid equilibrium curve of trans-1,2-dicyanocyclobutane and cis-1,2-dicyanocyclobutane under a pressure of 10 mm./Hg. It is a $x$–$y$ diagram of a system consisting of cis- and trans-isomers in which the relationship between $x$ and $y$ is plotted over the concentration of trans-isomer in the liquid phase of from zero to 100%. In the drawing, abscissa shows the mol fraction $x$ of trans-isomer contained in the liquid phase, and ordinate shows the mol fraction $y$ of trans-isomer in a liquid obtained by the condensation of vapor over the liquid phase.

The drawing indicates that the relative volatility of trans-isomer to cis-isomer becomes as high as more than 5 and thus the separation of trans-isomer from cis-isomer can be accomplished easily.

It is necessary in order to separate trans-isomer from cis-isomer that the residence time of the mixture of trans- and cis-isomers in the rectification-type reactor is longer than that corresponding to the number of theoretical plates normally required in the separation of these isomers.

We have, however, found that in the process of this invention, various substances are useful as catalysts in accelerating the isomerization reaction and shortening the required residence time of the isomeric mixture in the reactor.

One family of catalysts which may be used in the isomerization of this invention for the purpose set forth above include, as given in examples hereinafter, copper, nickel, stainless steel (SUS 27) and Monel. Among these, stainless steel, nickel and Monel are more advantageously used, since copper mentioned above tends to increase the formation of the tar.

Although titanium and zirconium can be used with a fair result, noble metals such as platinum, gold and silver show practically no catalyst activity.

These metals as exemplified above may be used in the form of inner wall of the reactor, distilling plates or packings.

Another family of catalysts which may be used in the isomerization of this invention include, for example, organic compounds such as aromatic hydroxy compounds, aliphatic carboxylic acids, and pyridines. The combination of these organic compounds with the metals exemplified above is most preferable.

Organic compounds which may be used in the process of this invention more specifically include aromatic hydroxy compounds, aliphatic mono- or dicarboxylic acids having not less than 4 carbon atoms and pyridines, all of which are difficultly vaporizable under the distillation conditions of trans-isomer.

It has been found that when the isomerization reaction is carried out at a temperature of 100–250° C. in the presence of 0.01–1.0% by weight of these organic compounds based on the weight of dinitrile used, the isomerization rate can be enhanced at least by 50% and, in some cases, as high as 500%, without forming practically any tarry matter, as compared with the reaction in the absence of these organic compounds.

Although the mechanism of the catalytic reaction is not clearly understood, on the premise that this invention is not bound by any particular theory, it is presumed that the bonding orbital of carbon atom bonded to nitrile group is excited by the interaction of polar group contained in the substance used as a catalyst with the nitrile group of the dinitrile or hydrogen atom to which said carbon atom is bonded.

Aromatic hydroxy compounds which may be used in the process of this invention include, for example, phenol, cresol, p-methoxyphenol, hydroquinone, catechol, p-chlorophenol, p-tert-butylcatechol, and p,p'-isopropylidene bis-phenol.

As carboxylic acids having not less than 4 carbon atoms, lauric acid, adipic acid, and sebacic acid may be used.

Pyridines which may be used in the process of this invention include, for example, pyridine, alkyl substituted pyridines such as 2-methylpyridine and pyridine carboxylic acid such as 2,6-pyridine dicarboxylic acid.

The process of this invention may be carried out either in a batch system or a continuous system.

DESCRIPTION OF THE PREFERRED EMBODIMENTS

The following examples will serve to illustrate this invention more fully.

Example 1

300 g. of 1,2-dicyanocyclobutane consisting of 130 g. of trans-isomer and 170 g. of cis-isomer was distilled in a rectification tower having height of 70 cm. and inner diameter of 4 cm., which was packed with 370 ml. of McMahon packing made of stainless steel (SUS 27) having a size of 6 mm.

The distillation was carried out for 20 hours under conditions including a reduced pressure of about 10 mm./Hg, a bath temperature of 180–200° C., an inner temperature of flask of 170–180° C., a tower-top temperature of 132–136° C. and a distillation rate of 0.25 ml./min. The distillate was 289 g. and it was confirmed by gas chromatography that the resultant distillate was wholly trans-isomer.

11 g. of tarry matter was obtained as a residue and it contained 2% of trans-isomer and 18% of cis-isomer.

During the operation, after a lapse of 14 hours from the starting of the distillation, about 80 g. of the reactant remaining in the flask was analyzed by gas chromatography and it was found that the composition was 5% by weight of trans-isomer and 95% by weight of cis-isomer.

*Comparative Example 1.*—The separation of trans-isomer from cis-isomer was conducted by using a hard glass Vigreaux-type rectification tower having height of 20 cm. and inner diameter of 1.5 cm., instead of the rectification tower used in Example 1.

A mixture consisting of 60 g. of trans-isomer and 40 g. of cis-isomer was subjected to distillation under conditions including a reduced pressure of 4 mm./Hg, a bath temperature of 150–180° C., a column temperature of 110–155° C. and an average distillation rate of 0.3 ml./min. As a result, 55 g. of a first fraction having B.P. 110–115° C., 10 g. of a second fraction having B.P. 115–145° C. and 33 g. of a third fraction having B.P. 145–151° C. were obtained. These fractions were analyzed by gas chromatography, respectively, and it was found that the first fraction consisted of 97% by weight of trans-isomer and 3% by weight of cis-isomer, and the remainder consisted of 12% by weight of trans-isomer and 88% by weight of cis-isomer. Thus, 58.5 g. of trans-isomer and 39.5 g. of cis-isomer were recovered and no isomerization was observed in the operation.

Example 2

60 g. of cis-isomer was isomerized by using the same rectification tower as used in Example 1. 50 g. of fraction obtained in the distillation carried out under conditions including a reduced pressure of 100 mm./Hg, a bath temperature of 260° C., a tower-top temperature of 190–200° C. and a distilling rate of about 0.5 ml./min. was confirmed by gas chromatography to be a 100% trans-isomer. Analysis of methanol soluble portion in the remaining tarry matter revealed that it contained 1.3 g. of trans-isomer and 0.9 g. of cis-isomer.

Inclusive of dinitrile in the tarry residue, the conversion was 98.5%, the selectivity was 86.9% and the isomerization yield was 85.5%. These values were calculated as follows:

Isomerization yield (percent)

$$= \frac{\text{trans-isomer produced (g.)}}{\text{cis-isomer charged (g.)}} \times 100$$

Conversion (percent)

$$= 100 - \frac{\text{(cis-isomer remained (g.))}}{\text{cis-isomer charged (g.)}} \times 100$$

Selectivity (percent)

$$= \frac{\text{isomerization yield (percent)}}{\text{conversion (percent)}} \times 100$$

Example 3

120 g. of cis-isomer was distilled by using the same rectification tower as used in Example 2 under conditions including a reduced pressure of 2 mm./Hg, a bath temperature of 150° C. and a distilling rate of 0.15 ml./min. The resultant fraction was confirmed to be a 100% trans-isomer by gas chromatography. Isomerization yield was 94.1%.

*Comparative Example 2.*—Four 50 cc. three-necked flasks which were flushed with nitrogen were charged with each portion of 20 g. of cis-isomer and each portion of 10 ml. of one McMahon packing of copper, nickel, stainless steel (SUS 27) sized 6 mm., and glass Raschig ring sized 4 mm. x 4 mm., respectively, and these four flasks were heated at 180° C. for 6 hours, while dinitriles were contacted intimately with packings by stirring. The change of dinitrile as the lapse of time was measured as shown in the following Table 2:

TABLE 2.—CHANGE AS THE LAPSE OF TIME

| Experiment No. | Type of fillers | Contact time (hrs.) | Percentage of unreacted cis-isomer | Yield of trans-isomer (percent) |
|---|---|---|---|---|
| 1 | Glass Raschig ring | 2 | 98.5 | 1.5 |
|  | do | 4 | 93.4 | 6.7 |
|  | do | 6 | 90.5 | 9.2 |
| 2 | Nickel-McMahon | 2 | 94.8 | 4.7 |
|  | do | 4 | 89.1 | 11.2 |
|  | do | 6 | 81.5 | 19.1 |
| 3 | Stainless Steel-McMahon | 2 | 96.3 | 4.0 |
|  | do | 4 | 91.0 | 8.4 |
|  | do | 6 | 82.6 | 17.0 |
| 4 | Copper-McMahon | 2 | 11.6 | 18.5 |
|  | do | 4 |  | 11 |
|  | do | 6 |  | 1.6 |

Analysis was conducted by gas chromatography using a column of Silicon DC550 and adiponitrile as an internal standard.

The percentage of unreacted cis-isomer and the yield of trans-isomer were calculated as follows:

Percentage of unreacted cis-isomer (percent)

$$= \frac{\text{amount of unreacted cis-isomer (g.)}}{\text{cis-isomer charged (g.)}} \times 100$$

Yield of trans-isomer (percent)

$$= \frac{\text{tras-isomer produced (g.)}}{\text{cis-isomer charged (g.)}} \times 100$$

The experiments were repeated according to the same procedures as described above except that various additives as specified below were used in place of fillers used therein. The results are shown in the following Table 3:

TABLE 3

| Experiment No. | Type of additive | Contact time (hrs.) | Percentage of unreacted cis-isomer | Yield of trans-isomer percent |
|---|---|---|---|---|
| 5 | None | 2 | 98.9 | 0.9 |
|  |  | 4 | 93.6 | 5.5 |
|  |  | 6 | 90.5 | 8.5 |
| 6 | 0.5% hydroquinone | 2 | 91.6 | 5.6 |
|  | do | 4 | 77.3 | 18.3 |
|  | do | 6 | 67.6 | 26.4 |
| 7 | 0.5% adipic acid | 2 | 82.7 | 4.5 |
|  | do | 4 | 83.9 | 12.1 |
|  | do | 6 | 75.8 | 19.5 |
| 8 | 0.5% pyridine | 2 | 91.5 | 4.2 |
|  | do | 4 | 80.0 | 12.3 |
|  | do | 6 | 69.7 | 21.3 |

From the above results, it can be noted that cis-isomer can be isomerized in the absence of an additive; that nickel and stainless steel accelerate only the isomerization reaction; and that although copper accelerates the isomerization reaction, it also enhances the formation of tarry matter undesirably too well.

They also show that the presence of aromatic hydroxy compounds, aliphatic carboxylic acids and pyridines remarkably catalyzes the isomerization reaction.

Example 4

Isomerization reactions were conducted by charging 60 g. of cis-isomer to a distillation flask in a rectification tower measuring 70 cm. high and 20 mm. of inner diameter and using various packings as specified below, under a reduced pressure of 10 mm./Hg and a bath temperature of 200° C. The results are shown in the following Table 4. The distillate compositions were analyzed by gas chromatography.

TABLE 4

| Experiment No. | | Distillation time (hr.) | Weight of distillate (g.) | Composition of distillate (percent) | | Isomerization yield [1] (percent) |
|---|---|---|---|---|---|---|
| | | | | Trans-isomer | Cis-isomer | |
| 9 | Nickel | 3.8 | 55 | 99 | 1 | 91.5 |
| 10 | Monel | 4.1 | 55 | 100 | | 91.7 |
| 11 | Stainless steel | 4.0 | 56 | 100 | | 93.3 |
| 12 | Glass | 5.3 | 51 | 96 | 4 | 81.6 |

[1] Calculated as follows:

$$\text{Isomerization yield (\%)} = \frac{(\text{Weight of distillate}) \times (\text{trans-isomer in distillate, percent})}{\text{Weight of cis-isomer charged}}$$

NOTE.—Fillers of nickel, Monel and stainless steel (SUS 27) are all of McMahon type sized 6 mm., and of glass is Raschig ring sized 4 mm. x 4 mm.

Example 5

Isomerization was conducted by using the same hard glass Vigreaux-type rectification tower as used in comparative Example 1. To a mixture of 30 g. of trans-isomer and 70 g. of cis-isomer was added 0.5 g. of p,p'-isopropylidene diphenol and the distillation was carried out under conditions including a reduced pressure of 4 mm./Hg, a bath temperature of 150–180° C., a column temperature of 110–135° C. and an average distillation rate of 0.25 ml./min. As a result, 96 parts of a fraction having B.P. 110–113° C. was distilled and 3.8 g. of residue was obtained. It was confirmed by gas chromatography that the resultant fraction was wholly of trans-isomer and the residue contained 0.8 g. of trans-isomer and 0.3 g. of cis-isomer.

We claim:

1. A process for isomerizing cis-1,2-dicyanocyclobutane to trans-1,2-dicyanocyclobutane which essentially consists of heating cis-1,2-dicyanocyclobutane in the liquid phase at a temperature of from 80–340° C. under atmospheric or subatmospheric pressure in the presence of a metal catalyst selected from the group consisting of copper, nickel, stainless steel, Monel, titanium and zirconium and an organic compound selected from the group consisting of phenol, cresol, p-methoxyphenol, hydroquinone, catechol, p-chlorophenol, p-tert-butylcatechol, p,p'-isopropylidene diphenol, lauric acid, adipic acid, sebacic acid, pyridine, 2-methylpyridine and 2,6-pyridine dicarboxylic acid, and distilling the resulting trans-1,2-dicyanocyclobutane continuously from the reaction system.

2. A process according to claim 1, wherein said metal catalyst is atomic nickel.

3. A process according to claim 1, wherein said metal catalyst is stainless steel.

4. A process according to claim 1, wherein said metal catalyst is Monel.

5. A process according to claim 1, wherein the reaction is carried out at a pressure of 1–760 mm. Hg.

References Cited

UNITED STATES PATENTS

| 3,092,654 | 6/1963 | Schreyer | 260—464 X |
| 3,192,262 | 6/1965 | Schreyer | 260—464 X |
| 3,246,027 | 4/1966 | Schreyer | 260—464 |
| 3,325,529 | 6/1967 | Greene et al. | 260—464 |

JOSEPH P. BRUST, Primary Examiner

U.S. Cl. X.R.

260—465.9